Nov. 18, 1947.   S. KROLL ET AL   2,431,259
COLLAPSIBLE BABY CARRIAGE
Filed April 28, 1944   4 Sheets-Sheet 3
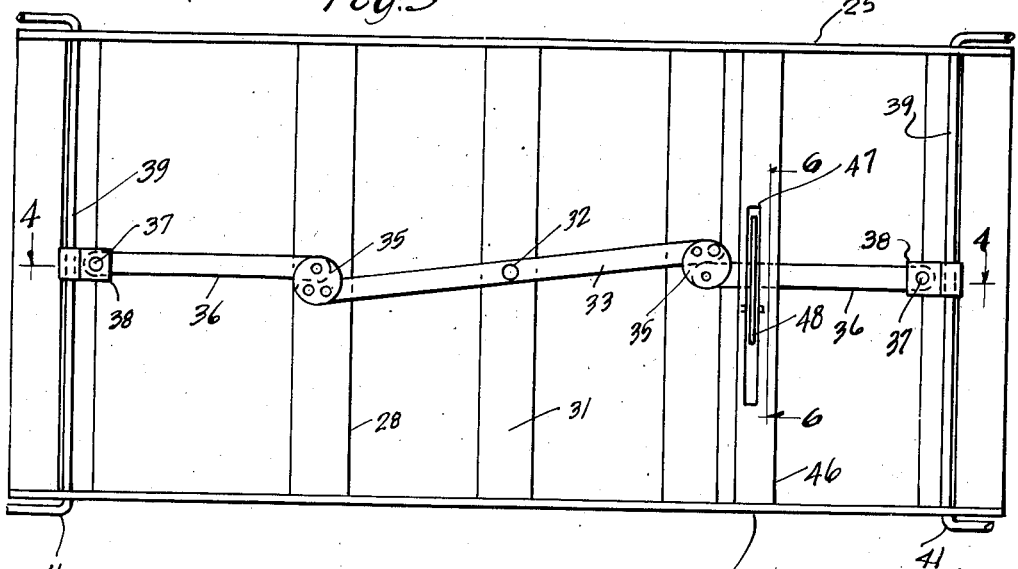
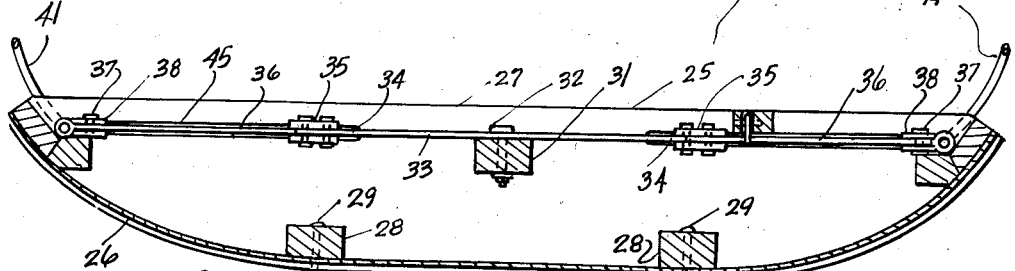
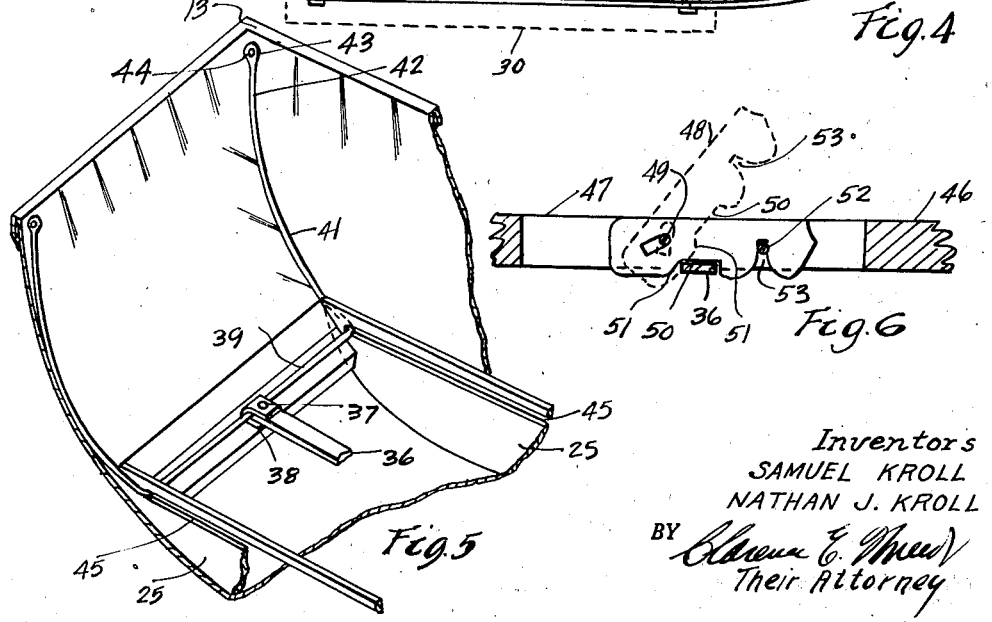
Inventors
SAMUEL KROLL
NATHAN J. KROLL
BY
Their Attorney

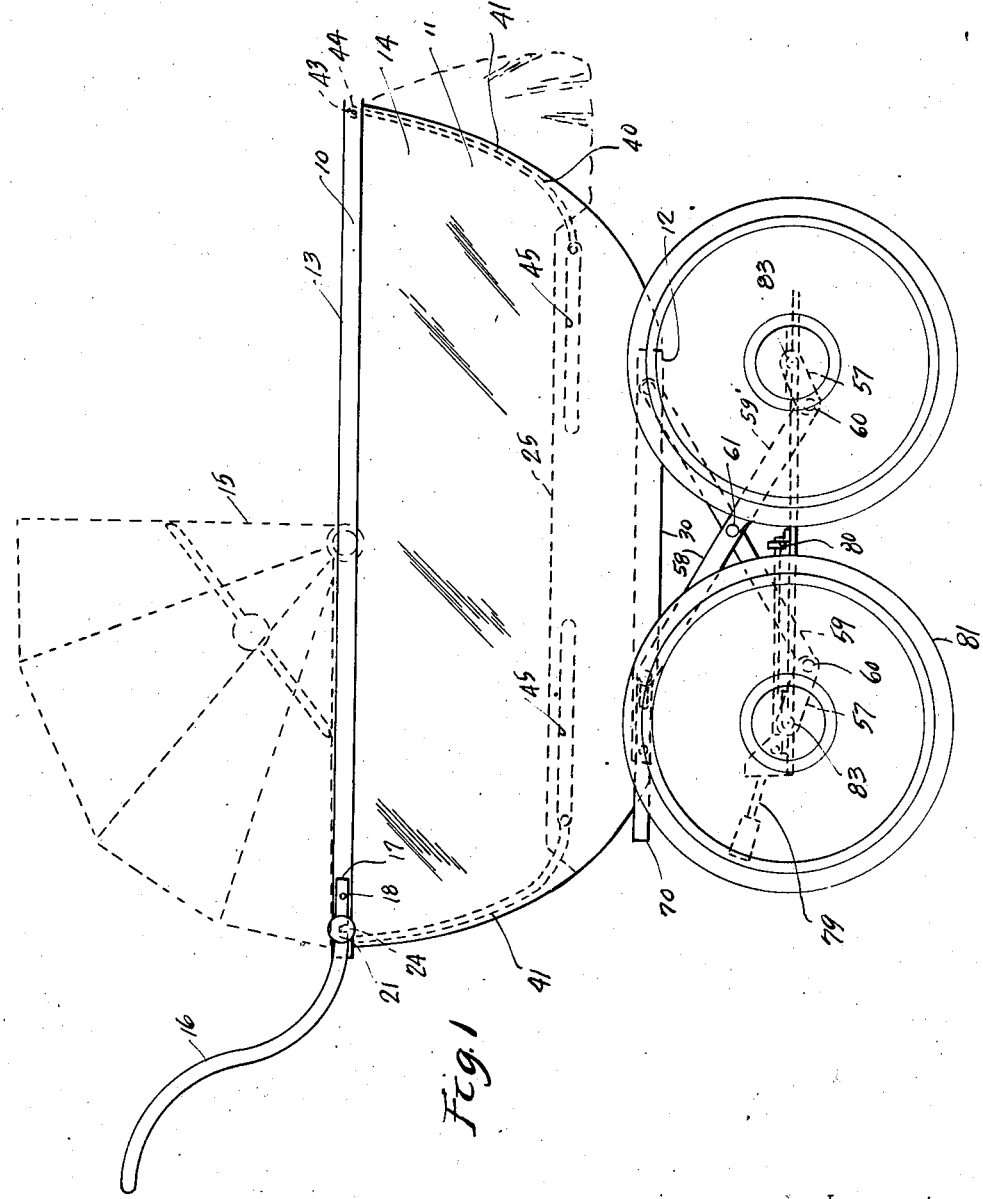
Inventors
SAMUEL KROLL
NATHAN J. KROLL
BY
Their Attorney

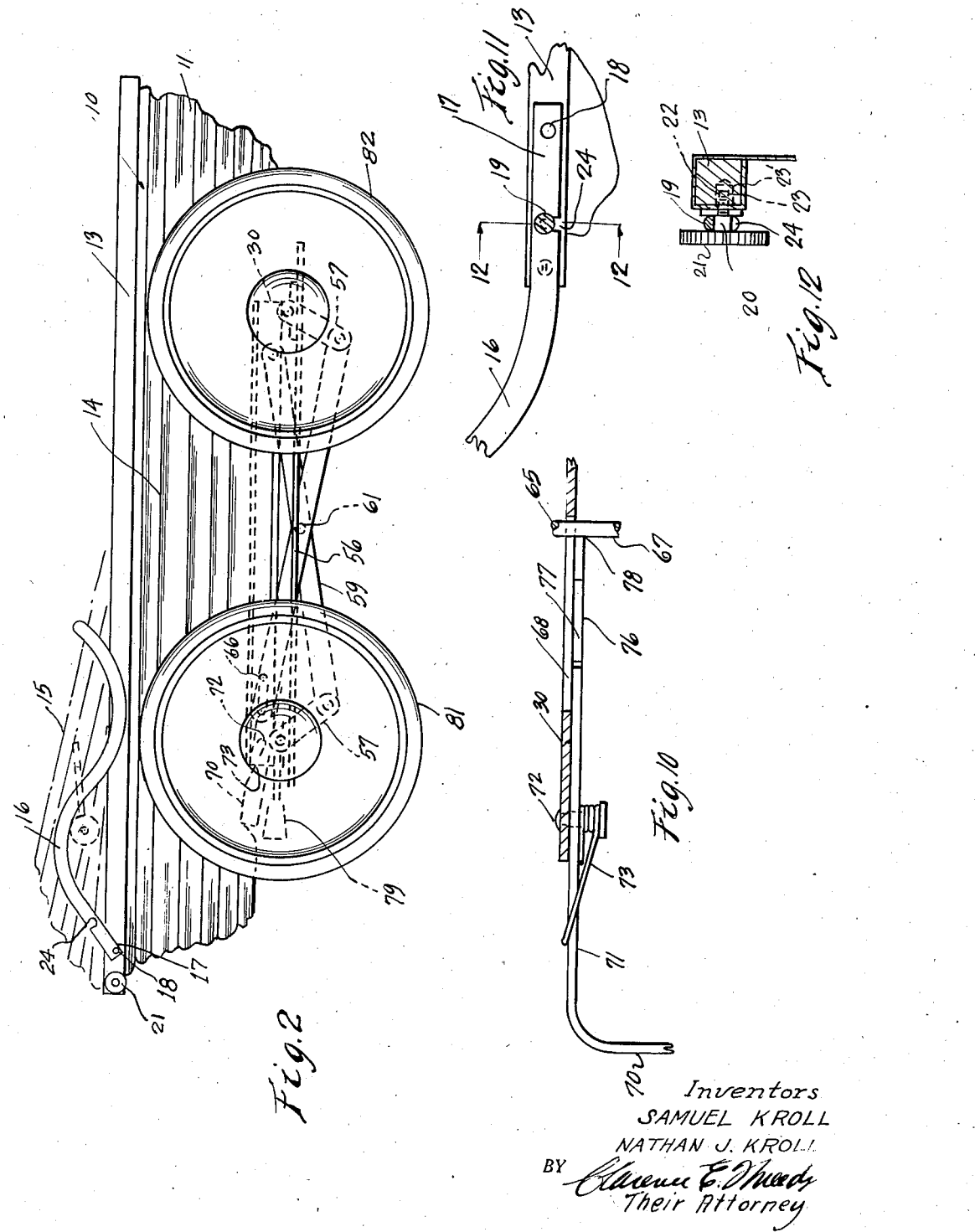

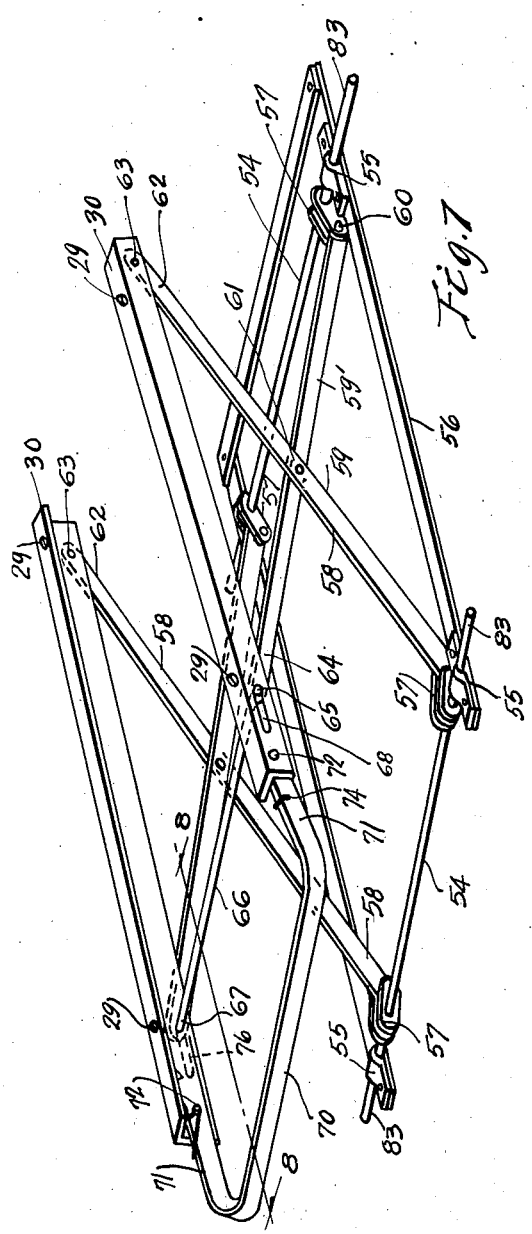

Patented Nov. 18, 1947

2,431,259

UNITED STATES PATENT OFFICE 2,431,259

COLLAPSIBLE BABY CARRIAGE

Samuel Kroll and Nathan J. Kroll, Chicago, Ill.

Application April 28, 1944, Serial No. 533,132

4 Claims. (Cl. 296—27)

This invention relates to certain new and useful improvements in baby carriages and has for its principal object the provision of an improved construction of this character which will be highly efficient in use and economical in manufacture.

Heretofore in the art of baby carriages, it was the common practice to provide a collapsible structure by the employment of what is commonly referred to in the industry as "scissors frames," the arrangement being such that the frames disposed on the outside of the body of the carriage were so associated with the gear or chassis as to permit the collapsibility of the body and chassis to a position between the wheels of the carriage. In such case the scissors structure, being on the outside of the body of the carriage, presented an appearance which is not entirely desirable from the beauty standpoint of a baby carriage and also afforded dangerous places for a child or baby to place its hands or other portions of its body, resulting in injury to the child upon collapsing of the carriage. Under the circumstances, it was the common practice to provide in the body of a baby carriage an arrangement whereby the sides and ends of the carriage could be collapsed to permit folding of the body between the wheels of the carriage. These and other well-known methods of collapsibility for a baby carriage presented problems of cost and complications in construction, in addition to resulting in inconvenience to the mother in the act of collapsing the carriage.

It is our primary object of this invention to provide a collapsible structure, the major portion of which is concealed from view; a structure which may be easily operated by the mother and when thus operated, results in a carriage collapsed to occupy the minimum of space.

A still further object of the invention is to provide a carriage with a body independently collapsible by one-motion operation, from the collapsibility of the chassis or gear of the carriage, thus resulting in a carriage which is convenient to collapse and one which permits the structure of the body to be concealed within the body, allowing the body of the carriage to possess that degree of appeal pleasing to the eye of the observer.

A still further object of the invention resides in the simple and expeditious arrangement of parts for collapsing the handle of the carriage.

A still further and equally important object of the invention resides in the simple arrangement for initially rendering operative the collapsing mechanism of the carriage body.

As a further object of the invention, we provide collapsing mechanism for the body which is rendered operative by a single motion of the operator.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of the carriage embodying our invention;

Fig. 2 is a side elevational view of the carriage showing the same in a collapsed position;

Fig. 3 is a plan view of the collapsing mechanism for the carriage body;

Fig. 4 is a sectional detail view taken substantially on line 4—4 of Fig. 3;

Fig. 5 is a fragmentary perspective view of the carriage body stay rods embodied in our invention;

Fig. 6 is a fragmentary sectional detail view taken substantially on line 6—6 of Fig. 3;

Fig. 7 is a perspective view of the chassis or gear structure of the carriage;

Fig. 8 is a fragmentary sectional detail view taken substantially on line 8—8 of Fig. 7;

Fig. 9 is a fragmentary sectional detail view similar to Fig. 8 but showing the latch bar in an unlatched position;

Fig. 10 is a fragmentary sectional detail view taken substantially on line 10—10 of Fig. 8;

Fig. 11 is a fragmentary side detail view of the handle structure embodied in our invention; and Fig. 12 is a fragmentary sectional detail view taken substantially on line 12—12 of Fig. 11.

The drawings illustrate the preferred form of construction by which the several objects of our invention are accomplished. In this connection a baby carriage is indicated at 10 and includes a body 11 of flexible construction usually formed of flexible material. This body 11 is supported in a manner hereinafter more fully set forth by a chassis or gear structure 12. The body 10 includes a frame 13 to which the flexible body section 14 of the body is attached in a manner well-known in the art. To this frame 13 is adjustably attached a hood 15 which may be of any approved construction and attached to the frame 13 in a manner well-known in the art.

To one end of the body 11 is positioned a handle 16 of any approved design. This handle is capable of forward collapsibility by virtue of the following described structure, reference being had particularly to Figs. 11 and 12.

In this connection, the ends 17 of the handle are pivotally connected as at 18 to the frame 13. Formed inwardly of the ends 17 of the handle 16 is an opening 19 of a diameter to receive a shank 20 formed as an integral part of a hand knob or wheel 21. Extending from this shank 20 is a reduced stud 22 threaded into a tapped opening 23 of an insert 23′ mounted in the frame 13. Communicating with the opening 19 is a slot 24 of reduced diameter and of a diameter slightly larger than the diameter of the threaded stud 22. The arrangement is such that by partially unscrewing the threaded stud from the insert 23', the shank 20 will be disposed from the opening 24, thus permitting the stud 22 to pass through the slot 24, allowing the handle 16 to be pivoted upon the baby carriage in substantially the manner shown in Fig. 2. When the handle 16 is in the position shown in Fig. 1, the threaded stud 22 is threaded into the insert 23', disposing the shank 20 in the opening 19, bearing the hand knob 20 against the handle, thereby securely latching the handle 16 in the position shown in Fig. 1.

Arranged within the body 11 is a mounting frame 25 having a bottom 26 curved to conform to the curvature of the bottom portion of the body 11. This mounting frame comprises opposite side walls 27. Disposed within the mounting frame in spaced relation with respect to each other are mounting blocks 28 connected by means of bolts 29 to the chassis bars 30 of the gear 12. Extending transversely of the mounting frame 25 intermediate opposite ends thereof and secured in any suitable manner to the walls 27 is a bearing block 31. Pivotally connected to this bearing block 31 by means of a pivot bolt 32 is a toggle bar 33 having its ends 34 pivotally connected as at 35 to toggle links 36. These toggle links 36 in turn have their end portions pivotally connected as at 37 to U-shaped brackets 38. These brackets 38 are carried by the bight portions 39 of stay rods 40 comprising opposite limb portions 41 curved to conform to the curvature of the ends of the body 11 and having (Fig. 5) their end portions 42 flattened as at 43 to provide bearing connection with the frame 13 through the medium of bolts 44.

These stay rods each operate in an elongated slot 45 formed in the side walls 27 of the mounting frame 25. Carried by the mounting frame 25 in a predetermined transverse position with respect thereto is a supporting block 46. This supporting block 46 has formed therein an elongated slot 47 (Figs. 3 and 6). Pivotally mounted in this slot 47 is a hand lever 48, the pivotal connection being accomplished through the medium of a slot and pin connection 49 as best shown in Fig. 6. This hand lever provides a cut-out portion 50 which receives the adjacent toggle link 36 when the hand lever is disposed in the slot 47 as shown in Fig. 6. Adjacent this cut-out portion 50, the hand lever provides a cam 51 which is adapted to engage the adjacent toggle link 36 when the hand lever is pivotally moved from the slot 47, during which movement the cam 51 bears against the adjacent toggle link 36 and moves the same out of alignment with the toggle bar 33 so as to permit the carriage body 11 to be collapsed in a manner hereinafter described. Carried by the supporting bar 46 is a limiting pin 52 which engages in a slot 53 formed in the hand lever 48 to limit the pivotal movement of this hand lever into the slot 47.

The mechanism thus far described has reference to the collapsing of the carriage body 11, which will now be briefly explained.

To collapse the carriage body the operator pivots the hand lever 48 from within the slot 47, bringing the cam 51 against the adjacent toggle link 36, thus imparting initial pivotal movement to the toggle bar 33. When this has taken place, the operator grasps the frame 13 and bears down thereupon. In thus bearing upon the frame 13, the guide stays are forced to ride in the grooves 45 to a position permitting the carriage body 11 to be collapsed in the position shown in Fig. 2. In thus collapsing the carriage body 11, it will be particularly noted that after the toggle links 36 have been pivoted from alignment with the toggle bar 33, all the mother need do is to firmly bear down upon the frame 13, pressing the carriage body to the collapsed position shown in Fig. 2. In collapsing the carriage body in the manner just described, it will be particularly noted that the only mechanism that the mother finds necessary to operate is the hand lever 48 to move the toggle links 36 from alignment with the toggle bar 33, it being pointed out that so long as the toggle links 36 remain in alignment with the toggle bar 33 the carriage body 11 cannot be collapsed.

The mounting frame with its collapsing mechanism, as a single unit, is mounted in the carriage body 11 and, as hereinbefore described, is connected to the chassis bars 30 of the gear 12 through the medium of the bolts 29. This gear 12 is collapsible independently of the carriage body 11 in the manner now to be described.

As shown particularly in Fig. 7, the gear comprises a pair of spaced axles 54 mounted as at 55 to the chassis frame 56 in a manner such as described in our Patent No. 2,287,315, dated June 23, 1943. Carried by these axles 54 are shackles 57. The sides of the gear comprise scissors frames 58. Each of these scissors frames 58 comprise crossbars 59 and 59', the ends of which are pivotally connected as at 60 to the shackles 57. The crossbars are pivotally connected together intermediate their end portions as at 61. The crossbar 59 of each of the scissors frames has its end portion 62 pivotally connected as at 63 to the chassis bar 30. The opposite end portion 64 of each of the bars 59' are connected as at 65 to a rod 66. The end portions 67 of this rod 66 operate in elongated slots 68 formed in the corresponding end portions 69 of the chassis bars 30. A U-shaped latch bar 70 has its limb portions 71 pivotally connected as at 72 to the end portions 69 of the chassis bars 30. This latch bar 70 is normally urged in the position shown in Fig. 8 by means of springs 73 each of which is carried by its respective pivot pin 72 and has one end 74 engaging the chassis bar 30 and the other end portion 75 bearing upon the limb 71. Formed in the inner end portions 76 of each of the limb portions 71 of the latch bar 70 is a tapered slot 77. The arrangement is such that when the gear is in extended position as shown in Figs. 1 and 7, the end portions 78 of the latch bar 70 will latch the rod 67 in the extreme forward end portion of the slots 68, thereby latching the gear structure against collapsing. To collapse the gear structure the mother engages the toe of her shoe against the latch bar 70 and pivots the same upwardly to substantially the position shown in Fig. 9. This permits free movement of the rod 66 in the slot 68 to the extent that the gear 12 may be collapsed to the position shown in Fig. 7. Associated with this gear is a brake structure 79 which may be of any approved construction including a brake bar 80 adapted to be brought into contact with the rear wheels 81 mounted in a well-known manner upon the end portions 83 of the axles 54.

In collapsing the gear 12 of the baby carriage, it will be noted that very little exertion is required on the part of the mother to bear the toe of her shoe against the latch bar 70 to pivot the same against the action of the springs 73 to permit free movement of the rod 67 in the slots 68, resulting in the collapsing of the gear. It will be noted that this movement is but a single movement and permits the free use of the mother's hands for other purposes. From this it is clear that the collapsibility of the gear is brought about by mechanism independently of the collapsibility of the carirage body 11, thus permitting the mother, if she so desires, to collapse only the gear 12. When this is done, the extended carriage body 11 is then disposed in a position lower than its normal position upon the collapsed gear.

The simplicity and economy of the construction embodied in our invention is obvious from the foregoing description.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A carriage comprising a collapsible body, a frame structure including stay members movable relative to each other and having opposite corresponding end portions fixed to said body and adapted to hold said body in extended condition, a toggle structure for connecting opposite correspondiing end portions of said stay members together for simultaneous movement from extended position with respect to said body to a position to collapse said body, manually operated means for initially moving said toggle structure in a direction to move said stay members toward each other to collapse said body, said means comprising a supporting bar carried by said frame structure, and a hand lever pivotally carried by said supporting bar and having a cam portion adapted to engage an element of said toggle structure when said lever is pivoted in one direction.

2. A carriage comprising a collapsible body, a frame structure including stay members movable relative to each other and having opposite corresponding end portions fixed to said body and adapted to hold said body in extended condition, a toggle structure for connecting opposite corresponding end portions of said stay members together for simultaneous movement from extended position with respect to said body to a position to collapse said body, said frame structure being wholly concealed within said body, manually operated means for initially moving said toggle structure in a direction to move said stay members toward each other to collapse said body, said means comprising a supporting bar carried by said frame structure, and a hand lever pivotally carried by said supporting bar and having a cam portion adapted to engage an element of said toggle structure when said lever is pivoted in one direction.

3. Means for collapsing and extending a flexible body of a baby carriage comprising a mounting frame arranged within the body upon the bottom thereof and having opposite side walls provided at corresponding ends with elongated slots, stay members operable in said slots and having limb portions secured to said body adjacent the open edge thereof, a toggle structure supported by said mounting frame and having toggle links with opposite end portions connected to said stay members whereby upon pivotal movement of said toggle structure said stay members will be moved in a direction in said slots to collapse said flexible body, and means providing a pivotal connection between the mounting frame and said toggle structure.

4. Means for collapsing and extending a flexible body of a baby carriage comprising a mounting frame arranged within the body upon the bottom thereof and having opposite side walls provided at corresponding ends with elongated slots, stay members operable in said slots and having limb portions secured to said body adjacent the open edge thereof, a toggle structure supported by said mounting frame and having toggle links with opposite end portions connected to said stay members whereby upon pivotal movement of said toggle structure said stay members will be moved in a direction in said slots to collapse said flexible body, means providing a pivotal connection between the mounting frame and said toggle structure, a mounting bar carried by said mounting frame, and means pivotally carried by said mounting bar and having a portion adapted to engage one of the links of said toggle structure whereby to impart initial movement to said toggle structure in body-collapsing direction upon pivotal movement of said means in one direction.

SAMUEL KROLL.
NATHAN J. KROLL.

REFERENCES CITED

The following references are of record in the file of this patent:

UNITED STATES PATENTS

| Number | Name | Date |
| --- | --- | --- |
| 729,651 | Olofsson | June 2, 1903 |
| 1,201,790 | Allen | Oct. 17, 1916 |
| 1,817,513 | Headley | Aug. 4, 1931 |
| 2,020,766 | Brown | Nov. 12, 1935 |
| 2,196,834 | Mahr | Apr. 9, 1940 |

FOREIGN PATENTS

| Number | Country | Date |
| --- | --- | --- |
| 640,844 | France | Apr. 7, 1928 |
| 663,257 | France | Apr. 8, 1929 |